United States Patent [19]
Astle

[11] Patent Number: 5,835,149
[45] Date of Patent: Nov. 10, 1998

[54] BIT ALLOCATION IN A CODED VIDEO SEQUENCE

[75] Inventor: Brian Astle, Plainsboro, N.J.

[73] Assignee: Intel Corporation, Santa Clara, Calif.

[21] Appl. No.: 881,932

[22] Filed: Jun. 25, 1997

Related U.S. Application Data

[63] Continuation of Ser. No. 468,446, Jun. 6, 1995, abandoned.

[51] Int. Cl.$^6$ ...................................................... H04N 7/30
[52] U.S. Cl. ........................................... 348/419; 348/405
[58] Field of Search ..................................... 348/400, 403, 348/405, 419, 420, 395, 401, 404, 409, 412, 415; 382/251, 239

[56] References Cited

U.S. PATENT DOCUMENTS

| | | | |
|---|---|---|---|
| 5,144,426 | 9/1992 | Tanaka et al. | 348/409 |
| 5,245,427 | 9/1993 | Kunihiro | 348/409 |
| 5,473,377 | 12/1995 | Kim | 348/405 |

*Primary Examiner*—Amelia Au
*Attorney, Agent, or Firm*—William H. Murray, Esq.; N. Stephan Kinsella, Esq.

[57] ABSTRACT

A computer-implemented method and apparatus for encoding video pictures of a sequence of video pictures, wherein each picture is defined by one picture type of a plurality of picture types and each picture has a complexity. According to a preferred embodiment, the complexity of each picture type is estimated to provide a complexity estimate for each picture type. Encoding a picture at an average quantization level produces an encoded bit stream having a codesize related to the complexity of the picture, and each picture type is associated with a target codesize. An average quantization level is determined for the first picture of each picture type in accordance with the target codesize and complexity estimate of each of the first pictures, respectively. The first picture of each picture type is then encoded at its respective average quantization level. An actual average quantization level at which each first picture was actually encoded is determined, and the complexity estimate for each picture type is updated in accordance with the actual average quantization level and codesize of the first picture of the picture type encoded.

29 Claims, 6 Drawing Sheets

BIT ALLOCATION IN A CODED VIDEO SEQUENCE

This application is a continuation of application(s) Ser. No. 08/468,446 filed on Jun. 6, 1995, now abandoned.

BACKGROUND OF THE INVENTION

1. Field the Invention

The present invention relates to signal processing and, in particular, to computer-implemented processes and apparatuses for bit allocation in a coded video sequence.

2. Description of the Related Art

This invention relates to signal processing which is often used to compress video image signals representative of video pictures into an encoded bitstream. Each picture may be a still image, or may be part of a plurality of successive pictures of video signal data that represent a motion video. As used herein, "picture" and "video picture" may interchangeably refer to signals representative of an image as hereinabove described. In some encoding standards, pictures are referred to as video frames.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes which decode the encoded signals. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections. Because transmission media have finite bandwidths, in order to provide video conferencing of satisfactory quality, each PC system preferably compresses or encodes in real time the video signals corresponding to the local participant and transmits the resulting compressed signals or bitstreams to the PC systems of the remote participants. Thus, the transmission capability of transmission media determine the rate at which bits in the bitstream are transmitted over the transmission media from a PC encoding system to a remote participant.

The objective of transmitting video information is to maximize perceived picture quality within constraints of the transmission channel. Most transmission channels have a fixed capacity, leading to a tradeoff between the quality of each picture and the picture rate. Thus, pictures may generally be transmitted at a fast rate but at a lower quality, or vice-versa. A standard transmission rate in the United States is 30 pictures/second in the International Standards Organization (ISO) ISO/IEC 11172 Moving Pictures Experts Group-1 standard (MPEG-1), or 30 frames/second in the ISO/IEC 13818 (MPEG-2) standard.

The overall picture quality is improved by the presence of delay in the system, because delay allows the encoder to take bits away from certain pictures and add bits to other pictures. This redistribution of bits might be utilized because some pictures are easier to encode than others, or may reflect different types of pictures in the bitstream. The implementation of these delays requires buffers in both the encoder and decoder. The larger the delay, and hence the larger the buffer, the greater the amount of redistribution that can occur and the higher the overall quality improvement that may be achieved due to such redistribution. The limit to this technique in real-time systems is usually set by an acceptable delay which, for example in video conferencing uses, is generally of the order of 200 to 500 ms.

The picture rate of the PC and the bit transmission rate (or, alternatively, the storage capacity of storage media) determine the average codesize per picture which is encoded by the encoding PC. The average target bitstream size per picture may be referred to herein as the average target codesize. The encoder thus typically encodes in real time an average target codesize per picture at the bit transmission rate. In such a video conferencing system, each PC system also preferably receives and decompresses compressed signals from the PC systems of the remote participants to play the decompressed video signals locally. The encoder may also, in some usages, encode video pictures offline to perform more computationintensive and more efficient encoding.

Such encoding operations that compress video image signals typically operate on subsets of the image, such as (8×8) blocks of pixels, or on macroblocks comprising a number of such blocks A macroblock typically comprises a (16×16) array of luminance pixels (also known as "luma pels") and two associated (8×8) blocks of chroma information. The (16×16) luma array is further divided into four (8×8) blocks, and all six blocks in a macroblock are typically transformed using the forward discrete cosine transform (DCT), quantized, and further encoded.

A higher amount of compression of the macroblocks constituting an image tends to lower the number of bits needed to represent the image, but also tends to diminish the quality of the image reconstructed by the decoder. In limited bandwidth environments, as described above, a limited number of encoded bits may be transmitted (or stored), on average, per image. Often, for example where a plurality of pictures are to be successively transmitted, there is a need to compress each image so that the bits for that image may be transmitted using the available communications channel bandwidth. If the images are not compressed enough then not all images may be transmitted using the available bandwidth, or might not be able to be stored as preferred in a mass storage device. If, however, some images are compressed more than is necessary, then some of the bandwidth is wasted that could have been used to transmit or store a higher quality image. Thus, the type and amount of compression may need to be altered for each picture and even for each block or macroblock within the picture in order to control the bitstream rate.

Typically, the (8×8) blocks of the image to be encoded are transformed by a forward DCT to generate a transformed signal comprising 64 DCT coefficients, which are also arranged in an (8×8) block. One technique for controlling the bit rate of the encoded bitstream is to select varying quantization levels at the encoding stage which are applied to the DCT coefficients to produce coefficient indexes. Varying quantization levels may be produced by using a basic quantization table which is multiplied or scaled by the quantization level (also sometimes referred to as the quantizer step size or quantization scale). Thus, when a basic quantization table is utilized in this manner, the quantization scale corresponds to the quantization level. For example, a quantization scale of 7 corresponds to a quantization level of 7, where 7 is multiplied by each entry in the basic quantization table to produce a scaled quantization table that corresponds to quantization level 7. A particular quantization level is typically selected within an acceptable range of quantization levels which are expected to produce approximately the desired codesize for the picture or block being encoded.

In quantization, each DCT coefficient is divided by the quantization factor in the corresponding (8×8) block position in order to reduce the number of bits needed to represent the coefficient. As is appreciated by those skilled in the art, use of a coarser quantization table, associated with a coarser (i.e. higher) quantization level, implies using fewer bits to encode an image but at the cost of image quality. Use of finer quantization tables results in encoded bitstreams with more bits but with higher quality images upon decompression or decoding. This type of bit rate control is often referred to as primary bit rate control. Secondary bit rate control involves the dropping of pictures or images from the video stream. The secondary bit rate control is a back-up mode in case the primary bit rate control is insufficient.

When encoding video picture signals, therefore, various techniques are utilized to meet the average target codesize. In one technique, each picture is encoded to independently meet the target codesize. Other techniques recognize that some pictures contain more complex information and are thus more difficult to encode in a given number of bits for a given level of quality, while other pictures represent simpler scenes that can be encoded for a given quality level in a smaller number of bits. Therefore, most techniques utilize video picture buffering to insert a delay into the encoding process to enhance the real-time encoding of video picture signals. Typically, the maximum amount of real-time delay is 200 to 500 ms, as described above. As described, this buffering allows more difficult-to-encode pictures to be encoded with a higher-than-average number of bits, while encoding simpler pictures within the buffer with a lower number of bits, so that the average target codesize is reached or approached over a moving three or four picture window. Thus, the target codesize for a given picture may be somewhat larger or smaller than the average target codesize.

The remote participant or decoding end which receives and decodes the encoded bitstream typically has a buffer capability to buffer the incoming encoded bitstream. Bitstream sequences representative of individual pictures are removed from the buffer by the decoder on average once every picture interval. If too few bits per picture are produced by the encoder, the decoder buffer may overflow, because not enough bits will be removed from the decoder buffer at each picture interval to keep the buffer from overflowing. In addition, if too few bits per picture are produced by the encoder, the pictures will be of lower quality than is attainable if more of the available bandwidth is utilized. If, on the other hand, too many bits per picture are produced by the encoder, the decoder buffer may underflow, as for example when not enough bits for the next picture have yet been received by the decoder buffer at the next picture interval. Underflow or overflow may cause some pictures to be skipped, or may produce temporal distortion or other undesirable results. Therefore, encoding systems attempt to meet the target codesize, so that, among other reasons, the receiving end buffer is not overflowed or underflowed.

When it is known what target codesize is desired to produce when encoding a given picture, the encoder attempts to produce approximately this number of encoded bits by applying the correct quantization level to the picture. For a desired codesize, the quantization level chosen will depend upon the complexity of the picture, i.e., the amount of detail in a picture, which determines how difficult it is to encode. Typically, an average quantization level is selected for an entire picture, and each block or macroblock of the picture is encoded at a local quantization level determined in accordance with the average quantization level for the picture and the local complexity. The local quantization level may only be allowed to vary within a predetermined range from the picture quantization level, for example, plus or minus two quantization levels. Thus, if the average quantization level is 10, each macroblock is encoded at a local quantization level of 8, 9, 10, 11, or 12.

One problem that is often encountered in encoding video pictures lies in the imprecise nature of estimating the complexity and other characteristics of each picture so that an appropriate quantization level may be selected to encode the picture. A more complex picture generally requires a coarser (i.e. higher) quantization level to yield a given codesize, and vice-versa. Thus, if a given picture is estimated to have a relatively high complexity, a higher quantization level may be utilized to achieve the target codesize for that picture. Conversely, if a picture is estimated to have a relatively low complexity, a finer quantization level may be utilized and still achieve the target codesize. However, sometimes the actual complexity of a picture is different than the estimated complexity, or the relationship between complexity and quantization level is different than the assumed relationship. Thus, when the complexity estimate for a given picture is incorrect, the selected quantization level, when applied to the picture, may produce too large or too small a codesize.

Further, existing techniques for encoding video signals at the highest possible quality while meeting a targeted average codesize often are overly complex, are not applicable to real-time rate control, and/or do not provide a sufficiently sophisticated means for optimizing the encoded video signal quality while avoiding buffer over- and underflow. Existing techniques include standards developed by the MPEG of the ISO, such as the MPEG-1 and MPEG-2 standards.

There is thus a need for improved methods and apparatuses for performing bit allocation and real-time sequence rate control for video signal encoders.

SUMMARY

There is provided herein a computer-implemented method and apparatus for encoding video pictures of a sequence of video pictures, wherein each picture is defined by one picture type of a plurality of picture types and each picture has a complexity. According to a preferred embodiment of the invention, the complexity of each picture type is estimated to provide a complexity estimate for each picture type. Encoding a picture at an average quantization level produces an encoded bitstream having a codesize related to the complexity of the picture, and each picture type is associated with a target codesize. An average quantization level is determined for the first picture of each picture type in accordance with the target codesize and complexity estimate of each of the first pictures, respectively. The first picture of each picture type is then encoded at its respective average quantization level. An actual average quantization level at which each first picture was actually encoded is determined, and the complexity estimate for each picture type is updated in accordance with the actual average quantization level and codesize of the first picture of the picture type encoded.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, there is disclosed a method and apparatus for dynamically adjusting the complexity estimate utilized in encoding pictures to yield a sequence of encoded bitstreams. The complexity of each picture is dynamically estimated using the past history of the encoding process with regard to previous pictures within the sequence and other characteristics of the currently encoded picture sequence, as described in further detail hereinbelow.

Video Processing System Hardware

Figure 1:
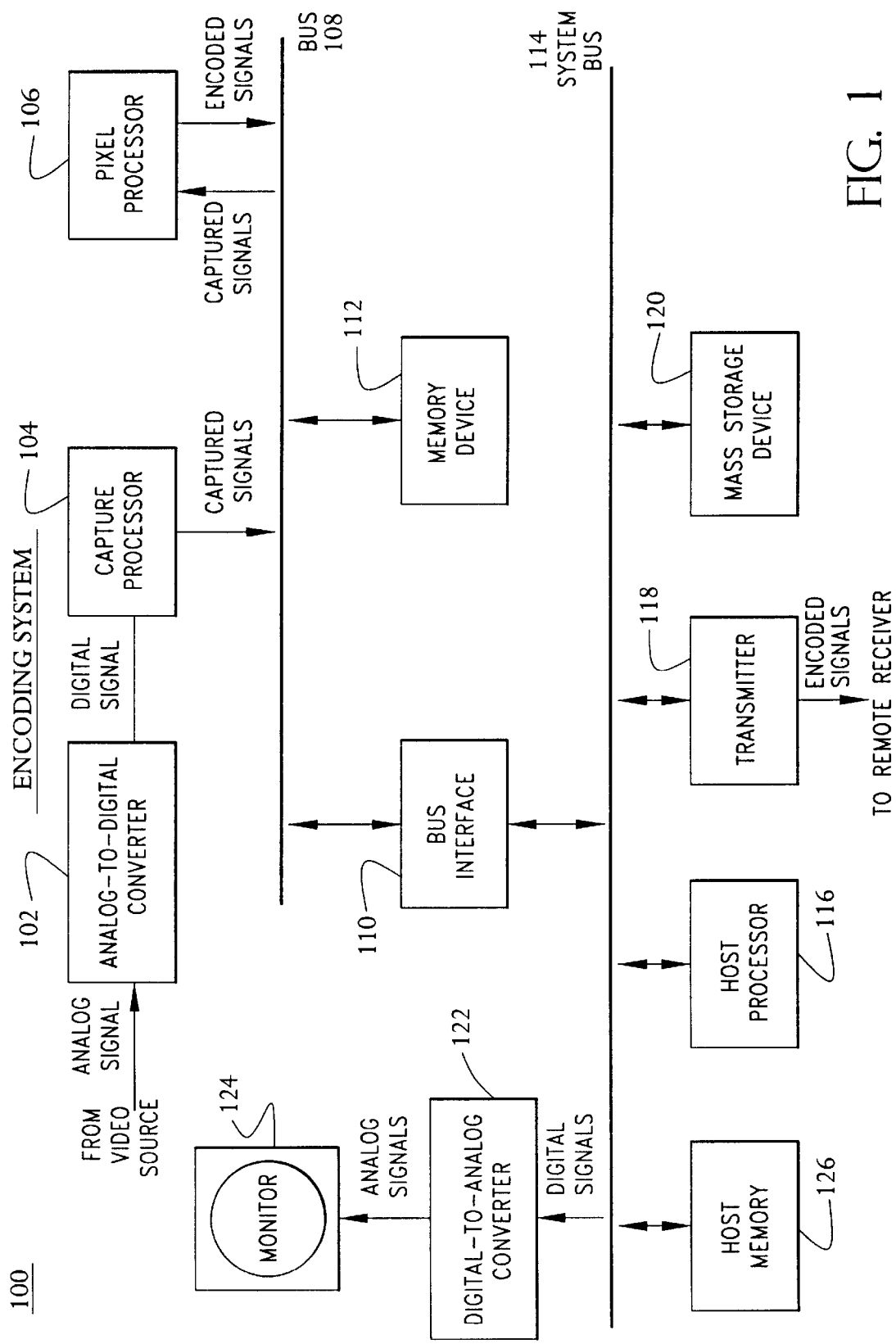
FIG. 1 is a computer-based video processing system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
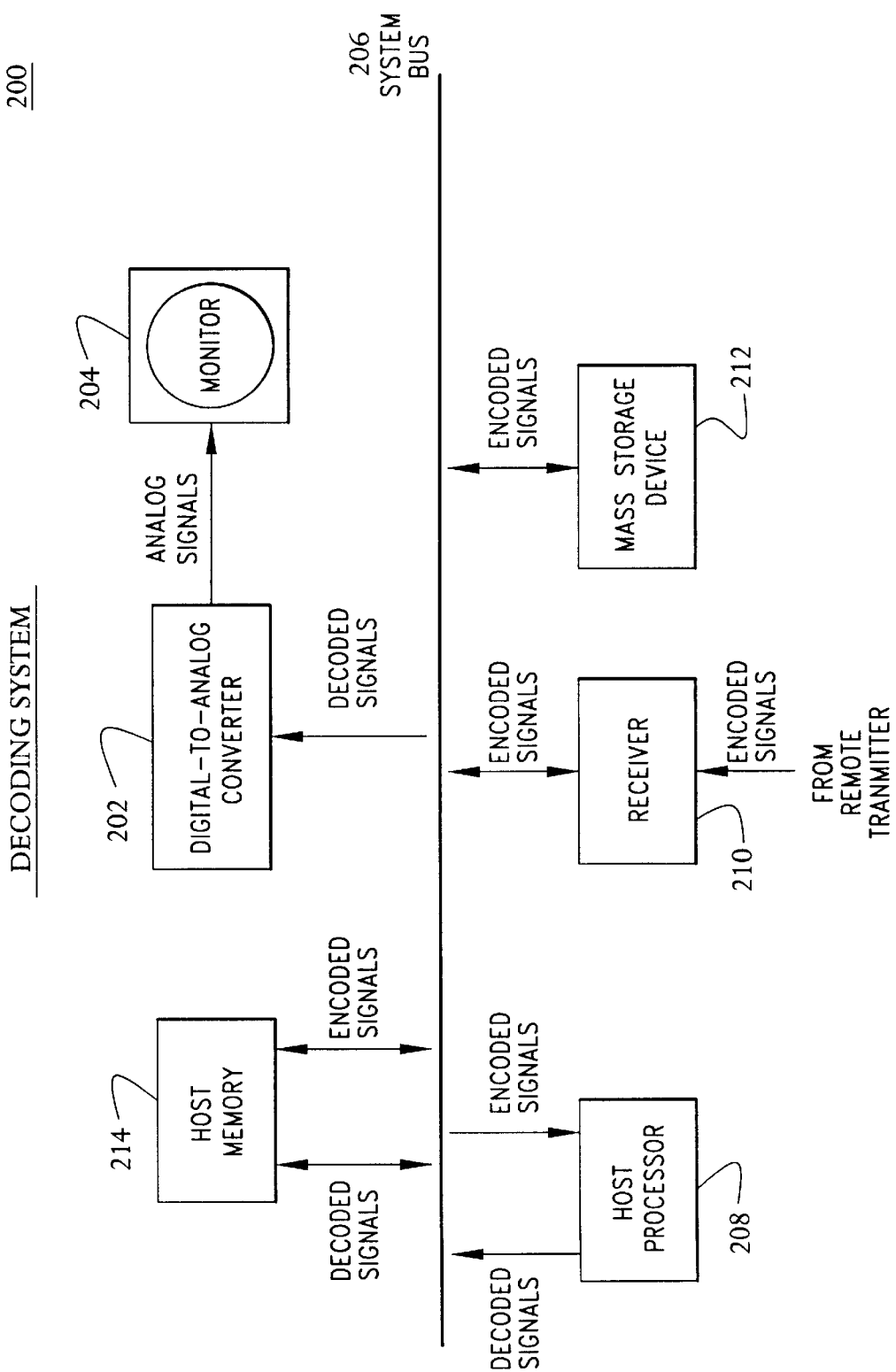
FIG. 2 is a computer-based decoding system for decoding the video signals encoded by the video processing system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote. receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200. Encoding system 100 controls the bitstream rate, i.e. codesize, of the encoded bitstream as described in further detail hereinbelow.

Motion Estimation Techniques

Motion estimation is commonly utilized in signal processing techniques in which successive video pictures are compressed. When these pictures are to be transmitted via a communication medium of limited bandwidth, or are to be stored in a storage medium having limited storage capacity, it is often desirable to first compress the pictures to yield an encoded bitstream. Motion estimation techniques exploit the temporal correlation that often exists between consecutive pictures, in which there is a tendency of some objects or image features to move within restricted boundaries from one location to another from picture to picture.

For instance, picture 1 may contain an object, and picture 2 may contain an identical set of pixels corresponding to the object spatially displaced by a few pixels from the location of the same set of pixels in picture 1. If picture 1 is transmitted by a video processor to a remote pixel processor or video processor (which. performs any necessary decompression or other decoding), picture 2 may be transmitted without the pixels corresponding to the object. Instead, information such as motion vectors or pointers is sent along with picture 2 (which may also be compressed using other techniques). These motion vectors may be utilized by the remote receiving video processor when decoding the received picture 2 to reproduce the object from picture 1 at a new location within picture 2. Since motion vectors can be represented with fewer bits than the pixels that constitute the object, fewer bits need to be transmitted (or stored) in order to recreate the object in Picture 2. As will be appreciated by those skilled in the art, difference blocks may also be transmitted along with motion vectors to improve the reconstruction process.

Pictures such as picture 1 that are not based on information from previously transmitted and decoded pictures are called intrapictures, or I pictures. Video pictures which are encoded with motion compensation techniques are referred to as predicted pictures, or P pictures, since their content is predicted from the content of previous I or P pictures. Because a P picture may be utilized as a base for a subsequent P picture, its quality should be as high as possible. In this application, I and P pictures are referred to as reference pictures since either may be used as a reference picture from which the content of a subsequent picture is predicted. Motion compensation-encoded pictures that do not need to be used as the bases for further motion-compensated pictures are called "bidirectional" or B pictures. B pictures are not intended for motion compensation use, so may be of lower quality and after decoded and displayed are typically discarded and not remembered, for future use. A B picture is predicted from either or both of two reference pictures, one of which is displayed before the B picture, and one of which is displayed after the B picture. However, the two reference pictures upon which a B picture is based are encoded and transmitted before the B picture so that the decoder has access to the two reference pictures in order to construct the B picture after its encoded bitstream received. As is understood by those skilled in the art, I, P, and B pictures are utilized in coding standards such as MPEG-1, while other standards, such as H.261 (Px64), developed by the International Telegraph Union (ITU), utilize only I and P pictures.

Thus, I pictures typically require the greatest number of bits to encode, P pictures require the next largest number of bits to encode, and B pictures require the least number of bits to encode. Such a scheme achieves satisfactory quality reconstructed video images, yet is more efficient in terms of the amount of bits that need to be transmitted than would be simply transmitting a succession of I pictures.

The motion estimation procedure may be performed at the encoder level by comparing given regions or blocks within a current picture to many regions or blocks within the previous picture. The process of comparing a given block of one picture to blocks of another picture to find a sufficiently similar match is often called "block matching," and the process of comparing one picture against another in this manner is often called "picture differencing." Blocks are matched by determining a "difference measurement" between any given pair of blocks. A difference measurement corresponds to the overall degree of difference of the two regions. If the difference measurement is below a predetermined threshold, the blocks are considered to be similar enough that a block match is indicated. If so, the block in the previous picture may be utilized as described above by the video decoder to reproduce the same block in the current picture.

During motion estimation techniques, a picture is compressed by comparing it to a previous picture, often the immediately preceding picture in a motion video clip or sequence. Where similar blocks are found in the previous picture, a motion vector is transmitted instead of the pixels for that block, which allows the block to be reconstructed from the reference block in the previous picture. As will be understood by those skilled in the art, a difference block may also be transmitted to reduce the residual errors remaining after motion compensation.

A first picture of a sequence has no previous picture so is sent without being encoded with motion estimation techniques. Such pictures are called "intra-pictures" or I pictures as described above, because the picture itself contains enough information for the receiving video processor to reconstruct it without referring to a previous picture. It will be understood that intra-pictures, while not encoded with motion estimation techniques, may be encoded with other data compression techniques that do not depend upon information from previous pictures.

Periodically, new I pictures or I blocks are sent, for otherwise cumulative errors may build up in the successively compressed and reconstructed pictures. I pictures may also be encoded and transmitted during transitions such as scene changes, in which previous pictures are too different from the current picture to allow for efficient motion estimation techniques. Scene cuts may be detected, as described immediately below.

Scene Cuts

As will be appreciated by those skilled in the art, various differencing methods may be used to determine the difference measurements described above. The basis of such a difference measurement, which is often utilized for block matching and picture differencing in motion estimation data compression techniques, is often a calculation known as the L1 Norm, which has the following form:

$$L1\ Norm = \sum_{i=0}^{i=n} \sum_{j=0}^{j=m} |a_{ij} - b_{ij}|$$

where:
$a_{ij}$ is a pixel in the ith row and jth column of the first block;
$b_{ij}$ is a pixel in the ith row and jth column of the second block;
n is the number of rows in a block; and
m is the number of columns in a block.

It will be appreciated by those skilled in the art that the lower the difference indicated by the L1 Norm calculation, the more similar are the two blocks being compared. It will also be appreciated that calculations other than the L1 Norm may be utilized to perform difference measurements between two blocks. For example, the L2 Norm has the following form:

$$L2\ Norm = \sum_{i=0}^{i=n} \sum_{j=0}^{j=m} (a_{ij} - b_{ij})^2$$

It will also be understood that a very large difference between two consecutive pictures, i.e. a difference above a predetermined threshold, indicates a discontinuity or very abrupt change between the two pictures being compared. Thus, as those skilled in the art will appreciate, the L1 or L2 Norms may also be used to implement a scene cut detection technique as described above.

In terminology typically associated with video, a "video shot" is a sequence of pictures that occurs between two scene cuts or other transitions such as fades or cross-fades. Thus, a video shot is a sequence of continuously-filmed or produced pictures generated by a video camera.

Encoder Rate Control

Figure 3:
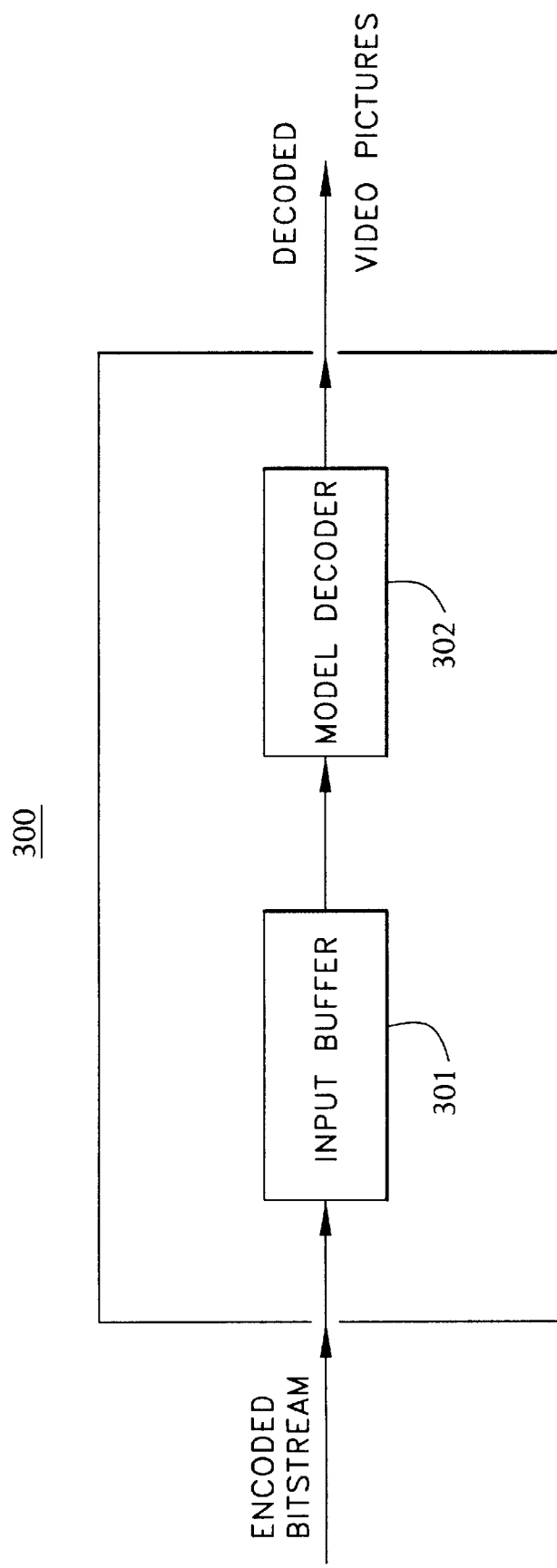
FIG. 3 is a video buffering verifier utilized by the video processing system of FIG. 1, according to a preferred embodiment of the present invention.

Referring now to FIG. 3, there is shown a video buffering verifier (VBV) 300 utilized by video processing system 100 of FIG. 1, according to a preferred embodiment of the present invention. VBV 300 comprises a hypothetical input buffer 301 and a hypothetical model decoder 302. VBV 300 receives an encoded bitstream representative of video signal data, buffers this bitstream data with input buffer 301, and decodes the bitstream with model decoder 302, thereby producing decoded pictures.

To ensure that encoded video bitstreams are encoded properly, the encoded bitstreams must meet the constraints of VBV 300. VBV 300 is a hypothetical model decoder which is conceptually connected to the output of an encoder such as transmitter 118 of video processing system 100. Encoded data is transmitted to the VBV 300 at the constant bit rate being used, and is (hypothetically) removed from the VBV 300 as described below. Given the characteristics of this VBV 300, it is a requirement of the video processing system 100 that the bitstream it produces will not cause buffer 301 of VBV 300 to either overflow or underflow.

The following are assumptions regarding the VBV 300 hypothetical construct. It will be appreciated that the model characteristics of VBV 300 may be based on known or expected characteristics of a potential video decoding system such as video decoding system 200. VBV 300 and the video encoder have the same clock frequency and the same picture rate, and are operated synchronously. Input buffer 301 of VBV 300 is initially empty, and is filled from the bitstream that is received from video processing system 100. A fixed rate channel is assumed to put bits at a constant rate into input buffer 301. At regular intervals, set by the picture rate (e.g., every ⅓₀th of a second), model decoder 302 instantaneously removes all the bits for the next picture from input buffer 301. If all the bits for the next picture have not been received, then input buffer 301 underflows and there is an underflow error. This may happen where too many pictures were encoded using too many bits, on average, each. If too many pictures having a relatively small average bitsize each are received by buffer 301, then not enough bits will be removed from buffer 301 at each picture interval and buffer 301 will overflow, causing an overflow error. Therefore, it is necessary to achieve an average target codesize in the encoding process, and to accurately predict the complexity of each picture being encoded in order to more efficiently reach this goal.

Figure 4:
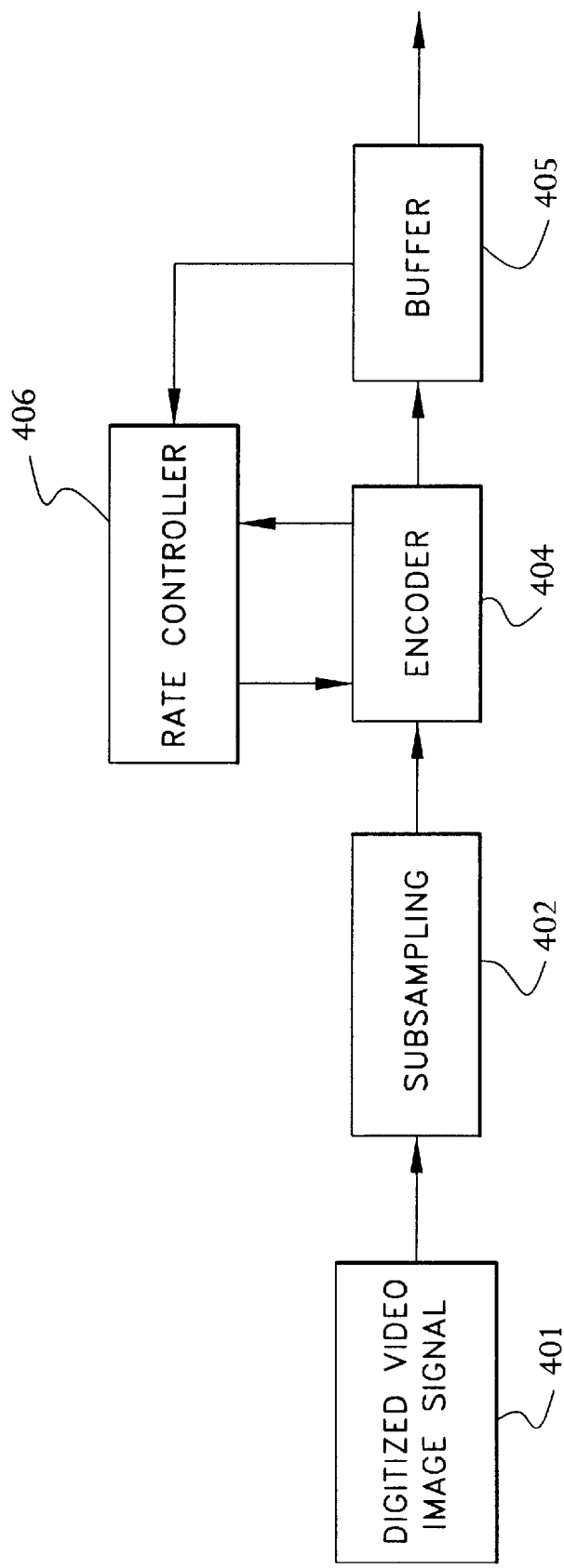
FIG. 4 is a process flow diagram of the encoding processing implemented by the video processing system of FIG. 1.

Referring now to FIG. 4, there is shown a process flow diagram of the encoding processing implemented by capture processor 104 and pixel processor 106 of FIG. 1, according to a preferred embodiment. of the present invention. As shown in FIG. 4, capture processor 104 of FIG. 1 captures and digitizes video image signals to provide a digitized video image signal 401. As described above, video image signal 401 is a single picture of video data, which may be a still image or one of a plurality of pictures that constitute motion video. Capture processor 104 further performs the subsampling 402 of digitized image 401 to provide a subsampled, digitized video image comprising an array of pixels. At this point the pixel array is broken up into subimages or blocks of (8×8) pixels which are encoded further.

Encoder 404, also under control of rate controller 406, applies a transform such as a DCT to the subimage blocks and quantizes the DCT coefficients at a determined quantization level, as described in further detail below. Buffer 405 next receives the encoded bitstream representing the quantized DCT coefficients for transmission via the transmission medium to a destination source. It will be understood by those skilled in the art that, in a preferred embodiment, the functional elements of the process flow diagram of FIG. 4 are implemented by capture processor 104 and pixel processor 106 of FIG. 1. Those skilled in the art will further appreciate that additional processing may be applied to video image signal 401 at or after the encoder 404 stage, such as motion estimation, inter- or intra-picture encoding, and run-length encoding.

Rate controller 406 adjusts the bit rate by varying the quantization levels to be applied to the DCT coefficients of the transformed video image in the following-described manner. Rate controller 406 attempts to produce a target codesize that is optimal for the applicable bandwidth and for VBV 300 characteristics as described above. For instance, if a first encoded picture yields an encoded bitstream having more bits than the target codesize for that picture, or if buffer 301 of FIG. 3 is in danger of underflow, a coarser (i.e., generally higher) quantization level may be applied to the next picture in order to reduce the bit rate so that the average bit rate approaches the target bitstream rate, and so that underflow of buffer 301 is avoided. If the average codesize per picture is above the target codesize for too long then buffer 301 will underflow and the information for a picture may be lost. If the average codesize or bit size per picture is below the target codesize for too long then buffer 301 will overflow, as described hereinabove. In this manner, VBV 300 is utilized to determine whether to use a finer or coarser quantization level to increase or decrease the target codesize for the next picture to be encoded. Thus, as will be understood by those skilled in the art, a finer or coarser quantization level may be used to increase or decrease the target codesize for the next picture so as to achieve the average target codesize.

A given quantization level Q corresponds to one of several quantization tables having generally coarser or finer quantization factors. A particular quantization table is achieved, in a preferred embodiment, by scaling a basic quantization table by the quantization level Q (also referred to as the quantization scale or quantizer step size), where Q may range from 1 to 31. Thus, each entry in the basic table is multiplied by the quantization level Q to form a quantization table corresponding to the desired quantization level. The new quantization table thus formed is used to quantize the DCT coefficients produced from DCT transforms applied to a given video image. The MPEG-1 encoding standard utilizes the quantization matrix as shown in Table 1, below, which may be used as the basic quantization table for the present invention:

TABLE 1

MPEG-1 Quantization Table

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

In quantization, each DCT coefficient of the coefficients of a transformed (8×8) block is divided by the quantization factor in the corresponding (8×8) block position of the applicable quantization table, and then either rounded to the nearest number or the fractional part is truncated. When DCT coefficients are scaled down in this manner by dividing by a quantization factor, many of them become zeros, making them easier to represent with fewer bits, for example by run-length encoding applied to the bitstream after the encoder stage 404.

One goal of such a bit rate control may be to minimize the total mean square error over the entire picture. Such a strategy may be appropriate for encoding video sequences comprising scene changes and where motion may occur in any region of the picture. However, in video conferencing usage, for example, scene changes may be rare or even nonexistent and motion tends to be concentrated in particular regions of the images (e.g., the center of the picture containing conference participants), while other regions containing background scenes may change infrequently, if at all. Moreover, the human eye is more sensitive to coding errors in different types of video scenes. For example, the human eye is more sensitive to coding errors in smooth or uniform regions (e.g., plain walls) than in regions of high random detail (e.g., foliage). Similarly, the human eye is more sensitive to coding errors in regions of stationary uniform detail (e.g., striped wallpaper) than in regions of motion (e.g., person moving across a room) . As such, overall video quality is improved by using finer quantization to encode those regions to which the human eye is more coding-error sensitive (thereby preserving more detail) than is used for those regions to which the human eye is less coding-error sensitive. In this manner, scarce transmission or storage bandwidth is shifted from less crucial to more crucial needs so that overall quality is improved.

As will be understood by those skilled in the art, some coding standards (such as MPEG-1) allow the quantization level to be varied throughout the picture, in order to match the local visual. complexity and achieve the best perceived quality of the coded picture. Within a picture the quantization level should be set higher in areas where there is more high-frequency energy, i.e. in areas of greater visual complexity, partly because quantization artifacts are less visible in such areas. Thus, in general the quantization level should be lower in "flat" or smooth areas (i.e. areas with low complexity or spatial energy), such as the sky, to reduce a quantization artifact known as "blockiness." Saving bits in complex or "busy" areas of a picture allows the encoder to reduce the quantization level in smooth areas of the picture and hence to reduce, or eliminate, artifacts such as blockiness.

Thus, each block may be quantized using a different quantization level. Typically, however, each (8×8) block within a macroblock is quantized at the same quantization level. Thus, quantization levels are usually chosen on a macroblock level, and this quantization level is applied to each block within the macroblock. The selection of which quantization level will be used is part of the bit rate control in the compression processing of the present invention. Rate controller 406 thus selects the quantization level at which to encode blocks within a macroblock based on some or all of the following factors: a characterization of the complexity of the picture (e.g., based on the sum of the absolute values of the DCT coefficients), the error variance, the actual fullness of rate control buffer 405 and the desired nominal fullness, image or block size, the current position within the picture, the results of prescan, the channel bit rate, picture rate, the experience of coding similar pictures earlier in the sequence, and the buffering capability of a decoding system such as decoding system 200. The manner of selecting the appropriate quantization level based on these factors is discussed in further detail hereinbelow.

Knowing the complexity of the previous image or picture, the quantization level used to encode the previous picture, and the resulting number of bits used to encode the previous picture, the quantization level for the current picture may be selected by comparing the complexity of the current picture to the complexity of the previous picture and taking into account the number of bits used to encode the previous picture relative to the target codesize.

In the present invention, as described in further detail hereinbelow, the complexity is dynamically estimated using the past history of the encoding process with regard to previous pictures within the sequence. The quantization level used to encode each region may be based on a measure of the complexity of the region and on the target codesize for the region, as discussed above. Where a region corresponds to a block of the picture, the complexity measure is preferably a weighted sum of the absolute values of the DCT coefficients for that block, where the weighting emphasizes the high-frequency DCT coefficients over the lowfrequency DCT coefficients.

In a preferred embodiment, therefore, as described above, the video image signals, which comprise pictures in a video conferencing environment, are divided into regions of (8×8) blocks, where each region may be encoded using a different quantization level. Rate controller 406 keeps track of the total number of bits used to encode each region of a picture, and of the total number of bits used to encode each picture.

The local quantization level $Q_{loc}$ for the current region of the current picture may be selected using the following equation:

$$Q_{loc} = Q_{ave} * \frac{(C_{ave} + R*C)}{(R*C_{ave} + C)},$$

where C is the complexity of the current region, $C_{ave}$ is the average complexity for the current picture, Q is the average quantization level for the current picture, and R is a specified constant (preferably with a value of approximately 2). Such a formula allows the quantization levels to vary from block to block within each picture, where the constant R determines the magnitude of the allowable variation. As will be understood, Q is set by rate controller 406 and varies from 1 to 31 in the MPEG-1 standard. Q varies on a logarithmic scale in the MPEG-2 standard. Thus, Q is selected by rate controller 406 to allocate bits between pictures, whereas rate controller 406 selects local quantization level $Q_{loc}$ as part of local rate control to allocate bits within a given picture.

When a DCT is performed on an (8×8) block of an image, 64 coefficients are produced. For the purposes of coding, these coefficients may be arranged in zig-zag fashion from the upper left corner of an (8×8) block down to the lower right corner. When arranged this way, the upper left corner of a block of DCT coefficients contain the DC component and lower frequency coefficients of the transformed block, while the lower right corner contains the higher frequency components of the transformed block. Larger quantization factors are grouped in the lower right regions of the each quantization table, as can be seen in Table 1, above, while smaller factors are grouped in the upper left region of a table. In this manner higher frequency coefficients tend to be divided by higher factors than the DC component and lower frequency components. The reason for this weighting is that loss of information in the higher frequency ranges is less visible to human visual perception than is loss of information in the lower frequency ranges.

Table 2 below provides an explanation of symbols used herein.

TABLE 2

| Symbol | Meaning |
|---|---|
| B picture | Bidirectional picture |
| b | Buffer: actual buffer fullness |
| bi | Buffer Initial: initial buffer fullness |
| bn | Buffer Nominal: nominal buffer fullness |
| bs | Buffer Size: size of input buffer 301 in bits |
| bt | Buffer Total: total buffer size |
| C | complexity of the current region |
| $C_{ave}$ | average complexity for the current picture |
| ca | average complexity |
| cam | complexity index multiplier |
| ci | Complexity Index: direct measure of the visual complexity |
| cn | Complexity Normalized: local normalized complexity |
| cr | Complexity Raw: raw complexity index |
| GOP | Group of Pictures (sequence of pictures) |
| I picture | Intra-picture |
| m | constant (1 for I and P pictures and r for B pictures) |
| ma | total number of macroblocks coded |
| mt | total number of macroblocks |
| $n_B$ | number of B pictures per GOP (e.g. 8) |
| $n_I$ | number of I pictures per GOP (e.g. 1) |
| $n_P$ | number of P pictures per GOP (e.g. 3) |
| $n_X$ | number of X (I, P, or B) pictures per GOP |
| nr | number of B pictures for every P picture |
| P picture | Predicted picture |
| $P_B$ | picture complexity for B pictures |
| $P_I$ | picture complexity for I pictures |
| $P_P$ | picture complexity for P pictures |
| $P_X$ | picture complexity for an X (I, P, or B) picture |
| Q | Quantization level: average quantization level for the current picture, set by rate controller |
| qa | cumulative average of $Q_{loc}$ |
| $Q_b$ | Q B pictures: equal to $r*Q_r$, average quantization scale for B pictures based on complexity estimates and nominal buffer fullness, and steady state |
| $Q_{loc}$ | local quantization level |
| $Q_r$ | Q Reference: average quantization level for reference pictures (I or P) based on complexity estimates and nominal buffer fullness, and steady state |
| r | Ratio of $Q_b/Q_r$ |
| t | total bits used |
| tc | total codesize |
| $t_I$ | target codesize for I pictures |
| $t_P$ | target codesize for P pictures |
| $t_B$ | target codesize for B pictures |
| $t_X$ | target codesize for X (I, P, or B) pictures |
| $t_a$ | average target codesize for pictures of a GOP |

Complexity and Quantization Level

In a video signal bitstream which contains encoded video signals representative of pictures, the bitstream is typically transmitted in the form of a sequence. A sequence is the top level of video coding, and begins with a sequence header which defines important parameters needed by the decoder. A sequence is typically divided into subunits. For example, the sequence header is followed by one or more groups of pictures (GOPs), wherein a GOP contains one or more individual pictures. A sequence may contain additional sequence headers, and a sequence is typically terminated by a sequence_end_code. This is a standard of the ISO that allows considerable flexibility in specifying parameters such as bit rate, picture rate, picture resolution, and picture aspect ratio. These parameters are specified in the sequence header.

According to the MPEG-1 standard of the ISO, GOPs as defined have several properties. A first property is that a GOP, in bitstream order, must start with an I picture, and may be followed by any number of I, P, or B pictures in any order. A second property of a GOP is that it must begin, in display order, with an I or a B picture, and must end with an I or a P picture. The smallest GOP consists of a single I picture, whereas the largest size is unlimited.

A GOP is typically, although not necessarily, contained wholly within one video shot, and a sequence may contain any number of video shots and GOPs. For example, a sequence may contain a plurality of video shots, each of which contains a plurality of GOPs. Sequences may be defined as beginning and ending where convenient. For example, two CD-ROMs each having picture data stored thereon may be considered to have two separate video sequences, one per each CD-ROM.

In techniques such as the MPEG-1 standard, the encoder typically divides sequences into GOPs of equal size, and tends to apply the same number of bits to each GOP. However, between GOPs there may be glitches and discontinuities. In the present invention, bits are allocated within a sequence to achieve rate control, by setting the quantization level to optimize picture quality while avoiding overflow and underflow of buffer 301.

As will be understood by those skilled in the art, target bit allocation involves estimating the number of bits available to encode the next picture, and is thus performed before encoding the picture. Given the target codesize to be achieved for a given macroblock of a picture, rate control sets the reference value of the quantization parameter for each macroblock of the picture that is predicted to yield the desired codesize. Adaptive quantization may be utilized to modulate the reference value of the quantization parameter according to the spatial complexity of the macroblock. In other words, the degree of complexity of visual information that a macroblock or picture is predicted to contain, combined with the codesize to be achieved, is used to determine the quantization level $Q_{loc}$ to apply to the macroblock or quantization level Q to apply to the picture.

As discussed above, there are typically three types of pictures in sequences, I, P, and B pictures. Within a given GOP, I pictures are typically allocated the highest number of encoded bits, since their quality must be the highest. P pictures are allocated a lower number of bits, and B pictures are allocated the lowest number of encoded bits per picture, since B pictures, after decoded and displayed, are usually discarded and not remembered for future use. For a data channel of 1.2 Mbits/sec, where pictures are encoded at a rate of 30 pictures/sec, each picture must average 40,000 bits. For a given GOP, the average 40,000 bits available may be allocated between I, P, and B pictures in different amounts.

For the first picture in a sequence, or for I pictures following scene cuts, a priori information about the picture is not available, so normal or default assumptions are made concerning the complexity of the picture and method of encoding chosen for the picture, to achieve the targeted codesize for that I picture. The target codesize may be determined based on channel bandwidth. The target codesize for the current I picture to be encoded may thus be determined from the ratio of I pictures to other types of pictures within the GOP. Given this estimate of the number of encoded bits that should be produced for the current picture, encoder 404 attempts to adjust the quantization level to produce the desired number of encoded bits for pictures, and for macroblocks within pictures.

For a picture of a given complexity, the size of the code produced by quantization is approximately given by the relationship codesize=complexity/Q, which is discussed further below with reference to Eq. 1. Thus, a more complex picture produces a larger codesize for a given quantization level, and a larger (i.e. coarser) quantization level produces a smaller codesize for a given complexity. Because the estimate of the complexity of a given picture may be inaccurate, and because the above relationship is inexact, the codesize produced for a selected Q may be smaller or larger than the number of bits desired. For this reason, as encoder 404 begins to encode successive pictures within a sequence, it keeps track of several parameters and variables to more accurately encode further pictures, and to achieve the target codesize for each picture.

Thus, as encoder 404 encodes each picture, it keeps track of the quantization level used and the actual number of bits produced, the type of picture encoded, how well the selected quantization level and complexity estimate predicted the number of bits produced, and whether buffer 301 is currently under or over the target codesize. Therefore, as described in more detail below, encoder 404 adjusts the quantization level dynamically for each picture, in light of the history of encoding previous pictures in a given scene (i.e., between scene cuts). As will be appreciated by those skilled in the art, most pictures within a scene or video shot tend to have similar visual characteristics such as complexity. Therefore, it is possible for an encoder to refine its encoding of subsequent pictures in a scene or video shot based on how well it encoded prior pictures in the video shot.

In the present invention a complexity variable $p_X$ is maintained for each picture type, namely I, P, and B pictures Accordingly, $p_B$ represents the picture complexity for B pictures, $p_I$ represents the picture complexity for I pictures, and $p_P$ represents the picture complexity for P pictures. Additionally, the notation $t_X$ represents the relative target codesize for an X picture, such that $t_I$ is the target codesize for I pictures, $t_P$ is the target codesize for P pictures, and $t_B$ is the target codesize for B pictures.

Therefore, in general the number of bits that will result from encoding a given picture is proportional to the complexity and inversely proportional to the quantization level selected by the encoder. In this usage a formula is typically utilized that relates the total bit size to the quantization level, so that the encoder can estimate which quantization level to choose to produce the desired number of bits. In the present invention rate control is performed by rate controller 406, which is implemented in encoding system 100. As described hereinabove, rate control is the setting of the quantization level used to encode a given video picture, so that picture quality is optimized while overflow and underflow of buffer 301 is avoided.

In the present invention, it is assumed that each GOP to be encoded contains $n_I$ I pictures, $n_P$ P pictures, and $n_B$ B pictures. The ratio nr represents the number of B pictures for every P picture. Typically, an I picture is transmitted periodically, e.g. every twelfth picture, with P and B pictures transmitted otherwise. Often a sequence of bitstreams representative of pictures is thus grouped into a GOP comprising pictures transmitted and decoded in a predetermined order, for example: I B B P B B P B B P B B. Sequences of GOPs typically are encoded in this order and transmitted consecutively, although the first GOP of a sequence is typically transmitted in a modified order. Thus, the pictures of the first two GOPs in a sequence may be illustrated in decode order as shown below, with vertical lines separating each GOP, where subscripts shown for the first GOP represent the temporal display order for the respective picture:

$I_0$ $P_3$ $B_1$ $B_2$ $P_6$ $B_4$ $B_5$ $P_9$ $B_7$ $B_8$ | $I_{12}$ $B_{10}$ $B_{11}$ $P_{15}$ $B_{13}$ $B_{14}$ . . .

As will be understood by those skilled in the art, B pictures $B_1$ and $B_2$ are displayed after $I_0$ and before $P_3$, but $I_0$ and $P_3$ are transmitted and decoded first since $B_1$ and $B_2$ are interpolated from $I_0$ and $P_3$, e.g. using motion estimation techniques. I pictures may be inserted in the middle of GOPs, or new GOPs begun (starting with I pictures) before a current GOP would have normally concluded, for example, if a scene cut is detected that requires a new I picture to be transmitted.

In a preferred embodiment of the present invention, $n_I=1$, $n_P=3$, and $n_B=8$, for a total of 12 pictures per GOP, normally. The codesize of the three picture types is $t_I$, $t_P$, and $t_B$, with an average codesize per picture, $t_a=3*t_B$, where $t_I=2*t_P=4*t_B$. Although most GOPs comprise 12 pictures, as explained above some GOPs may be cut short by having a new GOP begin with a new I picture, for example when a scene cut is detected. Alternatively, a GOP may have an I picture inserted where necessary before the next GOP begins. Thus, although for most GOPs $n_I=1$, more than one I picture may be transmitted where necessary. The first GOP of a sequence of GOPs may be configured slightly differently than typical subsequent GOPs because of initializing conditions, as mentioned above.

Figure 5:
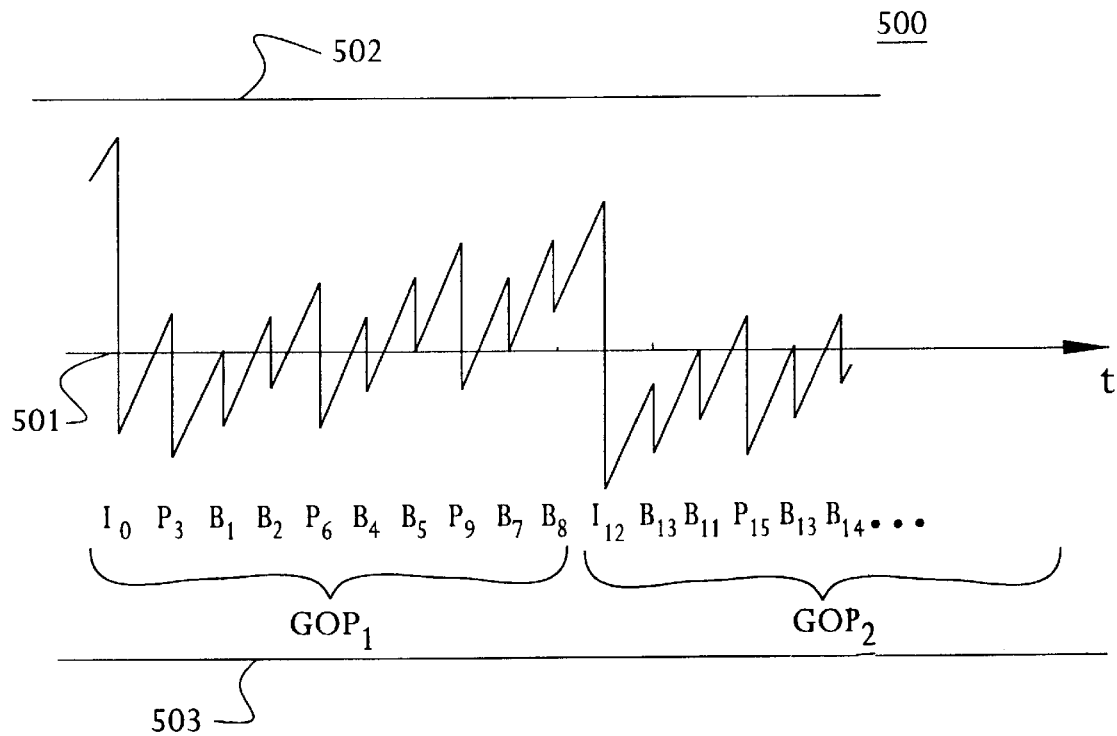
FIG. 5 is buffer occupancy diagram for a first group of pictures, illustrating the method of operation of the video system of FIG. 1.

Referring now to FIG. 5, there is shown buffer occupancy diagram 500 for a first GOP, GOP1, in a sequence, illustrating the method of operation of video system 100 of FIG. 1. As will be understood, diagram 500 represents the occupancy of buffer 301 of VBV 300. As illustrated, diagram 500 shows the order of receipt and decoding of pictures received by VBV 300. Subscripts of each picture type indicate the display order of the picture. In diagram 500, vertical lines represent instants at which model decoder 302 instantaneously reads a number of bits from buffer 301 that represent the next picture to be decoded. It will be understood that in practical embodiments bits may be read continuously rather than instantaneously as modeled by model decoder 302.

Because model decoder 302 reads pictures at a constant rate, the horizontal distance on the time axis on midpoint line 501 between vertical lines are equal. Diagonal lines joining vertical lines in diagram 500 represent bits flowing into buffer 301, and tend upwards as buffer 301 tends to fill up as new bits are received. These diagonals have the same slope because of the constant bit transmission rate of the data transmission channel. It will be appreciated that the ideal length of vertical lines corresponding to each picture type are proportional to the codesize parameters $t_I$, $t_P$, and $t_B$, because more bits are read from buffer 301 for an I picture than for a P picture, for example. However, in practice, the length of I, P, and B lines varies from the ideaL because of the above-described inaccuracies inherent in selecting the appropriate quantization levels in encoding blocks within the picture and because of unpredictable variations of picture complexity.

In a preferred embodiment, buffer 301 occupancy should be such that, for each I picture at the beginning of a GOP, other than the first I picture of the first GOP of a sequence, the vertical line corresponding to that I picture is centered vertically about midpoint line 501, which represents the midpoint of nominal buffer fullness for buffer 301. When a picture's vertical line is centered about midpoint line 501, this represents that the distance, in terms of bits of buffer 301, from overflow line 502 just before the picture is read is equal to the distance from underflow line 503 just after the picture is read from buffer 301. The reason for centering such pictures vertically about midpoint line 501 is to allow maximum flexibility to increase or decrease the amount of encoded bits as necessary. It will be understood that the target codesize produced by encoder 404 is adjusted so that overflow line 502 is not reached, nor is a corresponding underflow line 503 reached, to avoid over- and underflow of buffer 301 of VBV 300. It will be appreciated by those skilled in the art. that pictures $I_0$, and $P_3$ of GOP1 must be transmitted and decoded prior to pictures $B_1$, and $B_2$, because pictures $B_1$ and $B_2$, being bidirectional pictures, each require information from both pictures $I_0$ and $P_3$. However, for subsequent GOPs such as GOP2, pictures such as pictures $B_{10}$ and $B_{11}$ can be transmitted after $I_{12}$ only, since they may utilize information from $I_{12}$ and from $P_9$ of the previous GOP (GOP1, in FIG. 5).

Figure 6:
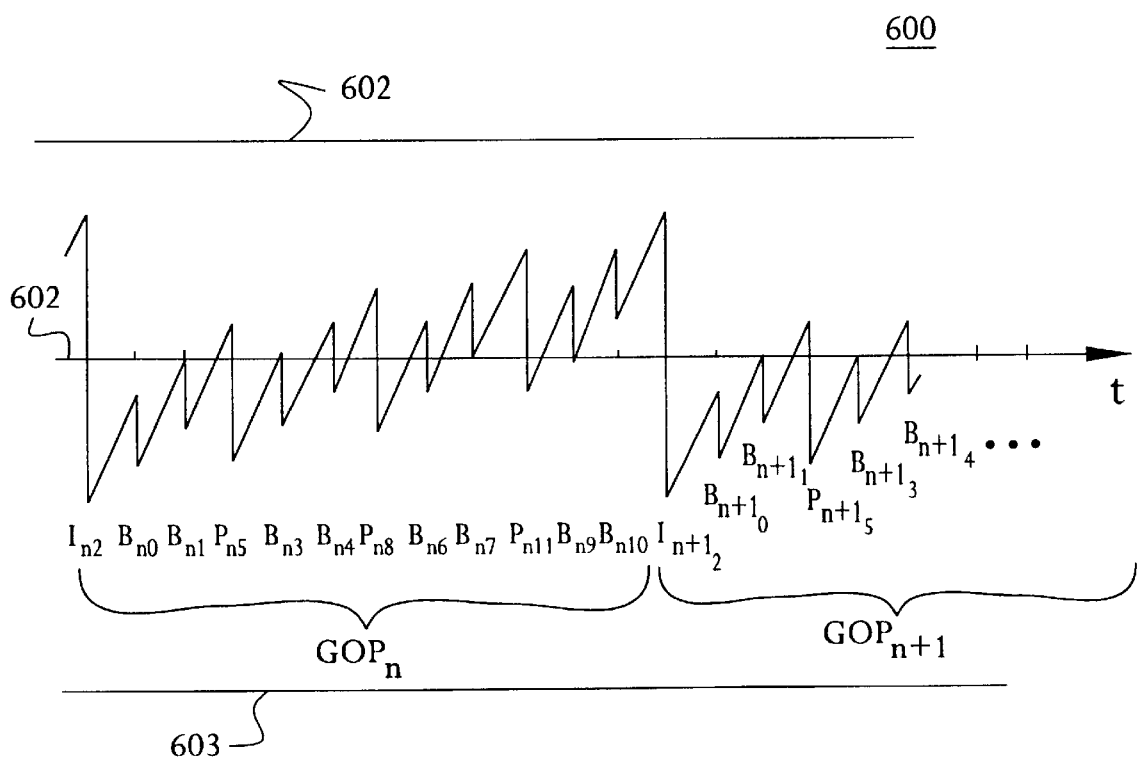
FIG. 6 is a buffer occupancy diagram for subsequent groups of pictures within a sequence, illustrating the method of operation of the video system of FIG. 1.

Referring now to FIG. 6, there is shown a buffer occupancy diagram 600 for subsequent GOPs within a sequence, illustrating the method of operation of video system 100 of FIG. 1. As in FIG. 5, midpoint line 601 represents the midpoint of buffer 301 fullness, overflow line 602 represents the point at which buffer 301 overflows, and underflow line 603 represents the point at which buffer 301 underflows. To avoid over- and underflow, the present invention dynamically adjusts the estimate of complexity $p_X$ for current pictures being encoded, to produce the target codesize $t_X$ for that picture type, or to make up for or take advantage of prior under- or over-estimates.

To obtain an estimate of the target codesize for each type of picture, a complexity variable $p_X$ is maintained for each picture type. For a picture quantization level Q, the codesize is given approximately by:

$$t_X = p_X/Q \quad \text{(Eq. 1)}$$

At the beginning of a sequence of GOPs or after a scene cut, codesizes are initialized to a set of values, for example with approximately the following ratios:

$$t_I = 2*t_P = 4*t_B \quad \text{(Eq. 2)}$$

Picture complexities are updated after coding each picture using Eq. 1, with the actual values of $t_X$ and Q. As will be appreciated, within a picture the macroblock quantization level, $Q_{loc}$, is calculated from Q and a local complexity index which is a measure of the visual complexity. Macroblock quantization level $Q_{loc}$ may then be further modified to prevent abrupt or trivial changes, and to avoid buffer under- or overflow.

Bit Allocation and Rate Control

Figure 7:
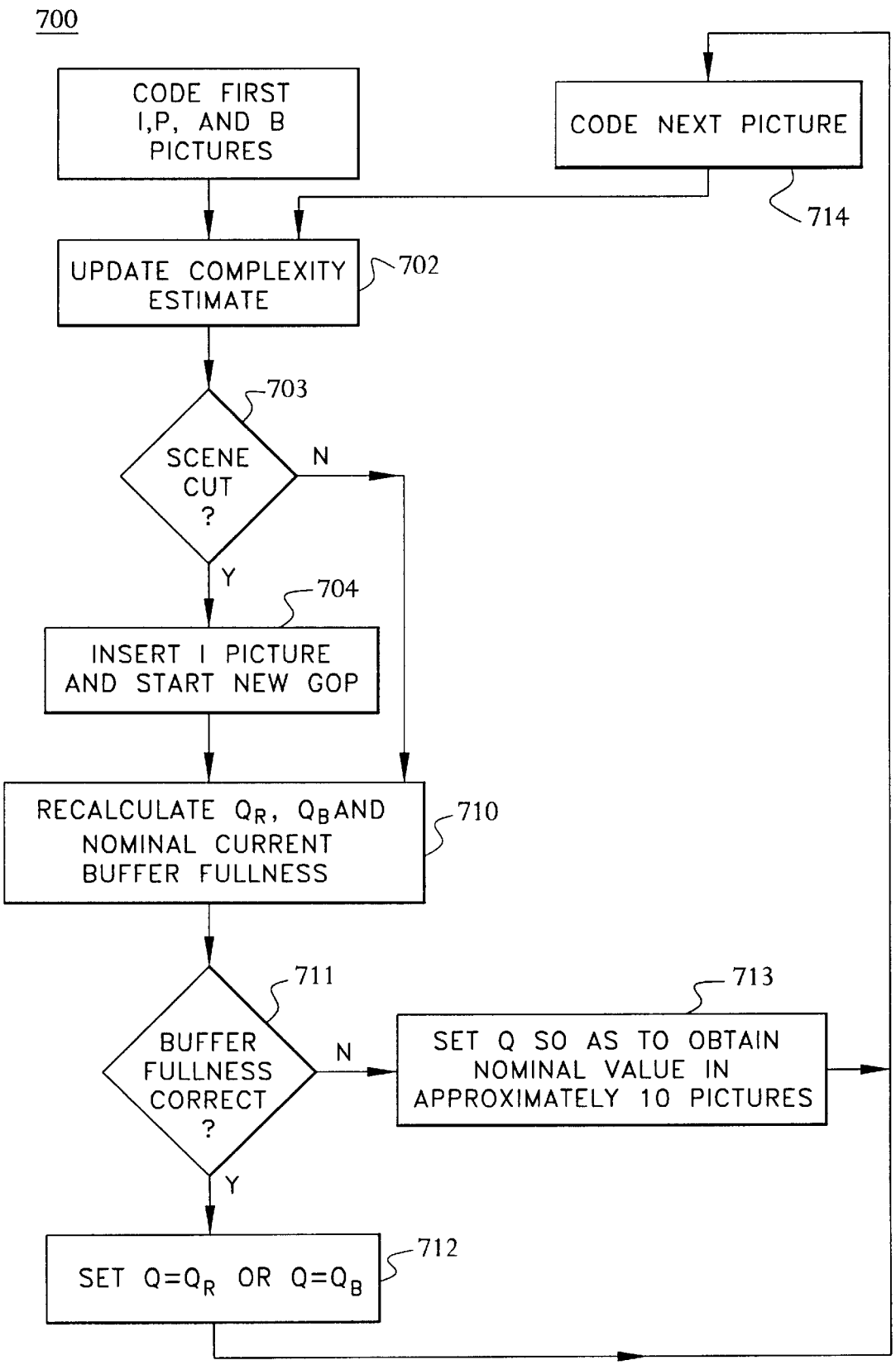
FIG. 7 is a flow chart of the method of operation of the video system of FIG. 1.

The method of the present invention will be described hereinbelow with reference to FIG. 7, which shows a flow chart 700 of the method of operation of video system 100 of FIG. 1. The first I, P, and B pictures of a GOP are encoded (step 701 of FIG. 7). Thereafter, the complexity estimate is updated in light of this encoding (step 702). For example, as described in more detail hereinbelow, if a certain complexity is estimated and used to achieve a desired codesize when encoding the first picture, and a larger codesize results than expected, the estimate of complexity can be retrospectively revised to more accurately estimate the complexity of further pictures of this type. If a scene cut is detected (step 703), then an I picture will be inserted to start a new GOP (step 704). Thereafter, $Q_r$ (the average quantization level for reference (I or P) pictures), $Q_b$ (the average quantization level for B pictures), and bn (the nominal buffer fullness) are recalculated (step 710). A determination is then made whether the current buffer fullness bn is correct, i.e. whether current buffer fullness is above or below its predicted fullness at the current. time (step 711). If so, Q is set to $Q_r$ for I or P pictures or to $Q_b$ for B pictures (step 712).

Otherwise, Q is adjusted so that nominal buffer fullness desired will be obtained after approximately ten pictures (step 713). This essentially recovers the nominal buffer fullness which deviates from its calculated nominal fullness due to prior encodings yielding either too large or too small a codesize due to errors in estimating the complexity. Step 713 thus nudges Q upwards or downwards to begin to gradually recover the nominal buffer fullness.

After Q has been set to $Q_r$ or $Q_b$ or adjusted for recovery (steps 712 and 713), the picture is then encoded using this average value of Q (step 714). After encoding this picture with Q, the complexity estimate is updated once more (step 702) and the above steps are repeated. Further details of these steps will now be described hereinbelow.

Start of Sequence

As will be understood, a sequence of n GOPs {GOP1, GOP2, . . . , GOPn} is often encoded and transmitted. At the beginning of a sequence of GOPs, i.e. when encoding GOP1, the default buffer fullness is calculated from Eq. 1 on the assumption that the target codesizes for I, P, and B pictures are related by Eq. 2. The target buffer fullness at the beginning of the first I picture of GOP2 is $(bs+t_I)/2$, where bs is the buffer size. Those skilled in the art will appreciate that the buffer size bs plus the codesize for the first I picture, divided by two, will tend to achieve the centered buffer fullness desired, as described with respect to picture $I_0$ and midpoint line 501 of FIG. 5 above. Working backwards gives an estimate for the initial buffer fullness bi:

$$\begin{aligned}\text{total bits/GOP} &= (n_I + n_P + n_B)^*t_a + bi - (bs + t_I)/2 & \text{(Eg. 3)}\\ &= n_I^*t_I + n_P^*t_P + n_B^*t_B \\ &= n_I^*t_I + n_P^*(t_I/2) + (2^*n_P + 2^*n_I - 2)^*(t_I/4) \\ &= (1.5^*n_I + n_P - 0.5)^*t_I \\ (1.5^*n_I + n_P)^*t_I &= (3^*n_I + 3^*n_P - 2)^*t_a + bi - bs/2\end{aligned}$$

where $t_a$ is the average codesize per picture, and $n_B$ is variable and is reduced by 2 for the first GOP, as discussed above.

For GOP2, $$\begin{aligned}\text{total bits/GOP} &= (n_I + n_P + n_B)^*t_a \\ &= n_I^*t_I + n_P^*t_P + n_B^*t_B \\ &= n_I^*t_I + n_P^*(t_I/2) + 2^*(n_I + n_P)^*(t_I/4) \\ &= (1.5^*n_I + n_P)^*t_I \\ (1.5^*n_I + n_P)^*t_I &= 3^*(n_I + n_P)^*t_a\end{aligned}$$

from Eq. 3:

$$bi = bs/2 + 2^*t_a \qquad \text{(Eg. 4)}$$

In this manner the initial buffer fullness bi is estimated at the beginning of a sequence of GOPs.

Start of Scene

At the beginning of a sequence of GOPs, or after a scene cut, picture complexity is adjusted dynamically during the coding (step 701) of the first I picture. This is useful when selecting the appropriate local quantization level $Q_{loc}$ during local rate control, so that encoding the current macroblock or region with $Q_{loc}$, assuming a certain complexity, produces the desired codesize for that macroblock. The target bit allocation, i.e. codesize, for the first I picture is calculated from Eq. 1 on the assumption given by Eq. 2. The target buffer fullness at the beginning of the first I picture of GOP2 is $(bs+t_I)/2$. Following the discussion above with respect to Eqs. 3 and 4, but substituting the actual buffer fullness b for bi, there is obtained:

$$(1.5^*n_I + n_P)^*t_I = (3^*(n_I + n_P) - 2)^*t_a + b - bs/2 \qquad \text{(Eq. 5)}$$

This allows $t_I$ to be calculated from b. Thus, rate controller 406 can determine the target codesize $t_I$ for the current I picture depending upon the actual buffer fullness b. If b is larger than the ideal, then $t_I$ will be adjusted to be smaller to compensate. During the coding of the first I picture, $C_{ave}$ and $Q_{loc}$ are dynamically adjusted, where $C_{ave}$ is the cumulative average of ci and ci is a direct measure of the visual complexity for I pictures. $Q_{loc}$ is changed to make the total codesize approximately equal to $t_I$. At each macroblock the cumulative average of $Q_{loc}$, qa, is determined and the complexity $P_I$ of the currently-encoded I picture estimated from the total bits, t, used up to that point:

$$p_I = (t^*mt/ma)^*qa$$

where ma is the total number of macroblocks coded, and mt is the total number of macroblocks. The actual $Q_{loc}$ for coding the macroblock is then found from the equation:

$$p_I = t_I^*Q_{loc}$$

Combining these two equations gives:

$$Q_{loc} = t^*mt^*qa/(ma^*t_I)$$

To avoid problems at the beginning of a picture, the header bits are not counted, the initial value of $Q_{loc}$ is set to 8, and $Q_{loc}$ is not allowed to change by more than 1 quantization level per macroblock.

At the end of the I picture, the average value of $Q_{loc}$, qa, is calculated and the complexity is estimated from the total codesize tc:

$$p_I = tc^*qa$$

For the first P picture, Q is set to qa, which was derived from the first I picture. Thus, after encoding the first I picture, the complexity estimate may be adjusted in light of the encoding of the I picture to more accurately encode the P picture (step 702). At the end of this P picture, the complexity $p_P$ for P pictures is set as follows:

$$p_P = tc^*Q$$

(Step 702) Those skilled in the art will realize that this value $p_P$, being based on information discovered during the encoding of the last P picture, will tend to be more accurate than a complexity estimate made without the benefit of this extra information. This value of Q (i.e., $Q_r$) is multiplied by the ratio r to form Q for the first B picture (i.e. $Q_b$) At the end of this B picture, the complexity is set as follows:

$$p_B = tc^*Q$$

(Step 702) After the first B picture has been coded, normal rate control is used.

Normal Calculation of Average Picture Quantization Level Q

At the beginning of each picture following the first three pictures after a scene cut, the average quantization level for reference (I or P) pictures, $Q_r$, is calculated from the following:

$$\begin{aligned} \text{total bits/GOP} &= (n_I + n_P + n_B)^* t_a \\ &= n_I{}^* p_I/Q_r + n_P{}^* p_P/Q_r + n_B{}^* p_B/r^*Q_r \\ &= (n_I{}^* p_I + n_P{}^* p_P + 2^*(n_I + n_P)^* p_B/r)/Q_r \end{aligned}$$

where $n_X$ is the number of pictures of type X in each GOP following the first GOP, GOP1. The target codesize for each picture is:

$t_I = p_I/Q_r$
$t_P = p_P/Q_r$
$t_B = p_B/(r * Q_r)$

Using this value of $Q_r$, the nominal buffer fullness bn is calculated (step 710). The actual buffer fullness, b, will differ from this amount. The difference can be made up in a sliding window of one approximately GOP (i.e., approximately ten pictures) by recalculating $Q_r$:

$$\begin{aligned} \text{total bits/GOP} &= (n_I + n_P + n_B)^* t_a + b - bn \\ &= n_I{}^* p_I/Q_r + n_P{}^* p_P/Q_r + n_B{}^* p_B/(r^*Q_r) \\ &= (n_I{}^* p_I + n_P{}^* p_P + 2^*(n_I + n_P)^* p_B/r)/Q_r \end{aligned}$$

Alternatively, a simpler formula may be used for this purpose, such as the following:

$$Q = m^*(1+(bn-b)/bt)^* Q_r$$

where bt is the total buffer size, m is 1 for I and P pictures and r for B pictures. In alternative preferred embodiments, the difference is made up in a fixed number of pictures, independent of GOP size. (Step 713)

The possibility of buffer underflow must next be considered, and Q modified if necessary. If the projected buffer fullness at the end of the current picture is less than a predetermined fraction of the buffer fullness, e.g. 1/32 then Q is changed so that the projected fullness is exactly equal to that value. The possibility of buffer overflow must also be avoided. If the projected buffer fullness at the beginning of the next picture is greater than another predetermined fraction of the buffer fullness, e.g. 31/32 then Q is changed so that the projected fullness is exactly equal to that value.

Calculation of $Q_{loc}$

The macroblock quantization level, $Q_{loc}$, is calculated from Q and a local picture complexity, and then modified if necessary to prevent buffer overflow or underflow. The complexity is calculated at the beginning of each macroblock. The raw complexity index, cr, is the minimum complexity of the four luma blocks of the macroblock. For I pictures, the complexity of each luma block is the sum of the absolute values of the DCT coefficients multiplied by the following weighting matrix:

| 0 | 1 | 2 | 4 | 8 | 16 | 16 | 16 |
|---|---|---|---|---|----|----|----|
| 1 | 2 | 4 | 8 | 16 | 16 | 16 | 16 |
| 2 | 4 | 8 | 16 | 16 | 16 | 16 | 16 |
| 4 | 8 | 16 | 16 | 16 | 16 | 16 | 16 |
| 8 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

For I pictures, ci is a direct measure of the visual complexity. For P and B pictures, cr is the residual error after motion compensation from an adjacent picture. For each macroblock, the following normalized complexity is computed:

$$cn = (cam^*cr + ca)/(cr + cam^*ca)$$

where ca is the average complexity estimated from the previous picture of the same type and cam is the complexity index multiplier. A typical value for cam is 2 for resolutions of 256×240, with cam being somewhat higher for resolutions of 352×240 e.g. 2.3 to 2.5.

The value of $Q_{loc}$ may be calculated from:

$$Q_{loc} = cn^*Q$$

where cn is the local normalized complexity. The value of $Q_{loc}$ is also clipped to the range 1 to 31. If $Q_{loc}$ differs by a small amount from the previous value of $Q_{loc}$, e.g. t-1 then it is set equal to the previous value for savings in codesize and with minimal error introduced since the difference is relatively small. When coding a macroblock, $Q_{loc}$ may be further changed to prevent buffer under- and overflow.

As will be appreciated by those skilled in the art, while encoding, the encoder could choose a complexity formula different from Eq. 1 recited above. For example, rather than utilizing Eq. 1 (i.e., $t_X = p_X/Q$), an equation having a linear relationship may be utilized, of the form:

$$t_X = K_1 - K_2^*Q \qquad \text{(Eq. 1')}$$

where $K_1$ and $K_2$ are constants. Such a linear complexity relationship may be more accurate for given bitstreams, and may be switched to during encoding if the encoder determines that use of Eq. 1' yields better prediction results for current image characteristics than does Eq. 1.

As will be understood, the more complex formula (Eq. 1') may be less useful for a short video scene, because there is less information available to characterize the images therein. However, for long scenes, e.g. where a video conference is taking place, and certain things are known about the image (e.g. similar scenes are expected from a fixed camera over a long period of time), then Eq. 1' may be utilized rather than Eq. 1 in the manner described herein to select the best Q. Because Eq. 1' is linear, after several Q values have been determined for varying picture complexity estimates, a "best fit" analysis may be performed to determine the value of constants $K_1$ and $K_2$, to more accurately determine Q values for subsequent pictures.

In an alternative preferred embodiment, after a scene cut, Q may be selected for the first picture of the current scene by determining whether the current picture is similar to representative scenes of prior scenes or shots. Thus, representative pictures may be stored for each separate video scene or shot, against which the current picture may be compared with the L1 or L2 Norm. The representative pictures may be stored at a lower resolution than normal pictures, and may be stored in a database which effectively indexes past scenes or shots that have been encoded. A method and apparatus for generating such an index of video scenes is disclosed in U.S. patent application Ser. No. 08/366,807, filing date Dec. 30, 1994, entitled "Video Database Indexing," the entirety of which is incorporated herein by reference.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for encoding video pictures of a sequence of video pictures, wherein each picture is defined by one picture type of a plurality of picture types and each picture has a complexity, the method comprising the steps of:
    (a) providing a complexity estimate for each picture type, wherein encoding a picture at an average quantization level produces an encoded bitstream having a codesize related to the complexity of the picture;
    (b) determining an average quantization level for the first picture of each picture type in accordance with a target codesize and complexity estimate of each said first picture, respectively;
    (c) encoding the first picture of each picture type at its respective average quantization level;
    (d) determining an actual average quantization level at which each first picture was actually encoded in step (c); and
    (e) updating the complexity estimate for each picture type in accordance with the actual average quantization level and codesize of the first picture of the picture type encoded in step (c).

2. The method of claim 1, wherein encoding a picture at the average quantization level produces an encoded bitstream having a codesize inversely related to the average quantization level.

3. The method of claim 1, wherein the plurality of picture types comprises intra pictures, predicted pictures, and bidirectional pictures.

4. The method of claim 1, wherein:
    the encoded bitstreams are received by a buffer of a hypothetical model decoder which reads the encoded bitstreams from the buffer for decoding the encoded bitstreams; and
    the target codesize for each picture is selected in order to avoid underflow and overflow of the buffer.

5. The method of claim 4, wherein:
    the target codesize for each picture is selected to achieve a nominal buffer fullness after the encoding of step (c); and
    step (b) further comprises the steps of:
        (1) comparing the actual buffer fullness achieved after a previous picture was encoded to the nominal buffer fullness for the encoding of the previous picture; and
        (2) adjusting the average quantization level in accordance with the comparison of step (b)(1).

6. The method of claim 5, wherein step (b)(2) comprises the step of:
    (2) if the actual buffer fullness differs from the nominal buffer fullness by more than a predetermined threshold, then adjusting the average quantization level to obtain nominal buffer fullness within a predetermined number of following pictures.

7. The method of claim 6, wherein the predetermined number of following pictures is ten.

8. The method of claim 6, wherein encoding a picture at the average quantization level produces an encoded bitstream having a codesize inversely related to the average quantization level.

9. The method of claim 6, wherein the plurality of picture types comprises intra pictures, predicted pictures, and bidirectional pictures.

10. An apparatus for encoding video pictures of a sequence of video pictures, wherein each picture is defined by one picture type of a plurality of picture types and each picture has a complexity, the apparatus comprising:
    (a) means for providing a complexity estimate for each picture type, wherein encoding a picture at an average quantization level produces an encoded bitstream having a codesize related to the complexity of the picture;
    (b) means for determining an average quantization level for the first picture of each picture type in accordance with a target codesize and complexity estimate of each said first picture, respectively;
    (c) means for encoding the first picture of each picture type at its respective average quantization level;
    (d) means for determining an actual average quantization level at which each first picture was actually encoded by means (c); and
    (e) means for updating the complexity estimate for each picture type in accordance with the actual average quantization level and codesize of the first picture of the picture type encoded by means (c).

11. The apparatus of claim 10, wherein encoding a picture at the average quantization level produces an encoded bitstream having a codesize inversely related to the average quantization level.

12. The apparatus of claim 10, wherein the plurality of picture types comprises intra pictures, predicted pictures, and bidirectional pictures.

13. The apparatus of claim 10, wherein:
    the encoded bitstreams are received by a buffer of a hypothetical model decoder which reads the encoded bitstreams from the buffer for decoding the encoded bitstreams; and
    the target codesize for each picture is selected in order to avoid underflow and overflow of the buffer.

14. The apparatus of claim 13, wherein:
    the target codesize for each picture is selected to achieve a nominal buffer fullness after the encoding of means (c); and
    means (b) further comprises:
        (1) means for comparing the actual buffer fullness achieved after a previous picture was encoded to the nominal buffer fullness for the encoding of the previous picture; and
        (2) means for adjusting the average quantization level in accordance with the comparison of means (b)(1).

15. The apparatus of claim 14, wherein means (b)(2) comprises means for adjusting the average quantization level to obtain nominal buffer fullness within a predetermined number of following pictures if the actual buffer fullness differs from the nominal buffer fullness by more than a predetermined threshold.

16. The apparatus of claim 15, wherein the predetermined number of following pictures is ten.

17. The apparatus of claim 15, wherein encoding a picture at the average quantization level produces an encoded bitstream having a codesize inversely related to the average quantization level.

18. The apparatus of claim 15, wherein the plurality of picture types comprises intra pictures, predicted pictures, and bidirectional pictures.

19. The apparatus of claim 15, wherein the apparatus is electrically connected to a bus and the bus is electrically connected to a memory device.

20. The apparatus of claim 10, wherein the apparatus is electrically connected to a bus and the bus is electrically connected to a memory device.

21. A computer-readable medium having stored thereon a plurality of instructions, wherein the plurality of instructions are for encoding video pictures of a sequence of video pictures, wherein each picture is defined by one picture type of a plurality of picture types and each picture has a complexity, and wherein the plurality of instructions, when executed by a processor of a computer system having a storage area, cause the processor to perform the steps of:

(a) providing a complexity estimate for each picture type, wherein encoding a picture at an average quantization level produces an encoded bitstream having a codesize related to the complexity of the picture;

(b) determining an average quantization level for the first picture of each picture type in accordance with a target codesize and complexity estimate of each said first picture, respectively;

(c) encoding the first picture of each picture type at its respective average quantization level;

(d) determining an actual average quantization level at which each first picture was actually encoded in step (c); and (e) updating the complexity estimate for each picture type in accordance with the actual average quantization level and codesize of the first picture of the picture type encoded in step (c).

22. The computer-readable medium of claim 21, wherein encoding a picture at the average quantization level produces an encoded bitstream having a codesize inversely related to the average quantization level.

23. The computer-readable medium of claim 21, wherein the plurality of picture types comprises intra pictures, predicted pictures, and bidirectional pictures.

24. The computer-readable medium of claim 21, wherein:

the encoded bitstreams are received by a buffer of a hypothetical model decoder which reads the encoded bitstreams from the buffer for decoding the encoded bitstreams; and the target codesize for each picture is selected in order to avoid underflow and overflow of the buffer.

25. The computer-readable medium of claim 24, wherein:

the target codesize for each picture is selected to achieve a nominal buffer fullness after the encoding of step (c); and step (b) further comprises the steps of:
(1) comparing the actual buffer fullness achieved after a previous picture was encoded to the nominal buffer fullness for the encoding of the previous picture; and
(2) adjusting the average quantization level in accordance with the comparison of step (b)(1).

26. The computer-readable medium of claim 25, wherein step (b)(2) comprises the step of:

(2) if the actual buffer fullness differs from the nominal buffer fullness by more than a predetermined threshold, then adjusting the average quantization level to obtain nominal buffer fullness within a predetermined number of following pictures.

27. The computer-readable medium of claim 26, wherein the predetermined number of following pictures is ten.

28. The computer-readable medium of claim 26, wherein encoding a picture at the average quantization level produces an encoded bitstream having a codesize inversely related to the average quantization level.

29. The computer-readable medium of claim 26, wherein the plurality of picture types comprises intra pictures, predicted pictures, and bidirectional pictures.

* * * * *